US 6,819,385 B2

(12) United States Patent
Lu

(10) Patent No.: US 6,819,385 B2
(45) Date of Patent: Nov. 16, 2004

(54) TRANSFLECTIVE PIXEL STRUCTURE

(75) Inventor: An-Hsu Lu, Taoyuan (TW)

(73) Assignee: Quanta Display Inc., Tauyuan (TW)

( * ) Notice: Subject to any disclaimer, the term of this patent is extended or adjusted under 35 U.S.C. 154(b) by 0 days.

(21) Appl. No.: 10/248,573

(22) Filed: Jan. 30, 2003

(65) Prior Publication Data

US 2004/0105058 A1 Jun. 3, 2004

(30) Foreign Application Priority Data

Dec. 3, 2002 (TW) .......................................... 91134997 A

(51) Int. Cl.[7] .......................................... G02F 1/1343
(52) U.S. Cl. ...................... 349/144; 349/113; 349/144; 349/42; 349/43; 349/38; 349/39; 257/59
(58) Field of Search ............................... 349/144, 113, 349/114, 42, 43, 38, 39; 257/59

(56) References Cited

U.S. PATENT DOCUMENTS 5,132,819 A * 7/1992 Noriyama et al. ............ 349/55
5,132,820 A * 7/1992 Someya et al. ............... 349/43
5,686,976 A * 11/1997 Nishikawa .................... 349/38
6,611,300 B1 * 8/2003 Ohkubo et al. ............... 349/43
6,697,138 B2 * 2/2004 Ha et al. ...................... 349/114

* cited by examiner

Primary Examiner—Tarifur R. Chowdhury
Assistant Examiner—George Y. Wang
(74) Attorney, Agent, or Firm—Jianq Chyun IP Office

(57) ABSTRACT

A transflective pixel structure, suitably formed on a substrate, having a scan line formed on the substrate, a gate dielectric layer formed on the substrate and covering the scan line, a data line, formed on the gate dielectric layer, a protection layer formed on a part of the gate dielectric layer and covering the data line, a transparent pixel electrode formed on the protection layer, a reflective pixel electrode formed on the exposed gate dielectric layer, and a double-drain thin-film transistor formed on the substrate. The double-drain thin-film transistor has a gate, a channel layer, a source region and two drain regions. The source region is electrically connected to the data line, the drain regions are coupled to the transparent and reflective pixel electrodes, respectively, and the gate is electrically connected to the scan line.

20 Claims, 5 Drawing Sheets

TRANSFLECTIVE PIXEL STRUCTURE

CROSS REFERENCE TO RELATED APPLICATIONS

This application claims the priority benefit of Taiwan application serial No. 91134997, filed Dec. 3, 2002.

BACKGROUND OF INVENTION

1. Field of the Invention

The invention relates in general to a thin-film transistor (TFT) liquid crystal display (LCD), and more particularly, to a transflective pixel structure.

2. Related Art of the Invention

The thin-film transistor liquid crystal display is basically constructed with a thin-film transistor array substrate, a color filter array substrate, and a liquid crystal layer. The thin-film transistor array substrate includes a plurality of pixel structures arranged as an array, in which a plurality of thin-film transistors is formed, and each thin-film transistor has a corresponding pixel electrode. Each thin-film transistor has a gate, a channel layer, a drain region and a source region to be used as a switching device of the liquid crystal display.

FIG. 1 shows a top view of a conventional pixel structure, and FIG. 2 shows a schematic cross-sectional view along the line I–I' as shown in FIG. 1.

Referring to FIGS. 1 and 2, in the fabrication method of the conventional pixel structure, a gate 102 and a scan line 101 are formed on a substrate 100. The scan line 101 is coupled to the gate 102. A gate dielectric layer 104 is further formed on the substrate 100 to cover the gate 102 and the scan line 101. An amorphous silicon channel layer 106 is formed on the gate dielectric layer 104 over the gate 102, and an Ohmic contact layer 108 is formed on the amorphous silicon channel layer 106. A source/drain region 112a/112b is then formed on the Ohmic contact layer 108. Meanwhile, a data line connected to the source region 112a is defined on the gate dielectric layer 104. The gate 102, the channel layer 106 and the source/drain region 112a/112b construct a thin-film transistor 130. A protection layer 114 is then formed over the substrate 100 to cover the thin-film transistor 130. The protection layer 114 is patterned to form an opening 116 therein. A pixel electrode 118 is formed on the protection layer 114. The pixel electrode 118 is electrically connected to the drain region 112b via the opening 116.

In the above pixel structure, a scan line 101a formed neighboring the pixel structure further comprises a pixel storage capacitor 120. The pixel storage capacitor 120 comprises the scan line 101a (as a bottom electrode), a conductive layer 124 corresponding to the scan line 101a and the pixel electrode (as a top electrode), and the gate dielectric layer 104 formed between the bottom and top electrode. The conductive layer 124 and the pixel electrode 118 are electrically connected via an opening 126 formed in the protection layer 114.

According to the above, the thin-film transistor 130 of the conventional pixel structure is located at a corner of the pixel structure to drive the complete pixel structure, and the pixel storage capacitor 120 is disposed on another scan line 101a. Therefore, the design of such a pixel structure is easy to fail due to process contamination particles. That is, if a contamination particle is attached to a part of the pixel structure to cause defects such as short circuit, the whole pixel structure cannot operate normally. Further, as the pixel storage capacitor 120 is formed on the scan line 101a, an additional stage of design is required for scanning waveform. Therefore, the design and fabrication process of the driving circuit are complex.

In addition, in the conventional transflective liquid crystal display, a plurality of reflective pixel structures and a plurality of transparent pixel structures are used or a semi-transparent film is formed on a substrate to obtain the transflective effect. Currently, a single pixel structure with co-existent transparent and reflective structures to attain transflective effect has not been disclosed yet.

SUMMARY OF INVENTION

The present invention provides a transflective pixel structure to resolve the problem occurring to the conventional pixel structure.

The present invention further provides a transflective pixel structure with both transparent and reflective structures coexistent in a single pixel structure.

The transflective pixel structure provided by the present invention provides is suitably formed on a substrate. The transflective pixel structure comprises a scan line, a gate dielectric layer, a data line, a protection layer, a transparent pixel electrode, a reflective pixel electrode and a double-drain thin-film transistor. The scan line is formed on the substrate. The gate dielectric layer is formed on the substrate to cover the scan line. The data line is formed on the gate dielectric layer with an extension direction different from that of the scan line. The protection layer is formed on a part of the gate dielectric layer covering the data line. The transparent pixel electrode is formed on the protection layer, and the part of the transparent pixel electrode over the scan line has a plurality of openings to reduce the parasitic capacitance between the scan line and the transparent pixel electrode. The reflective pixel electrode is formed on the exposed gate dielectric layer, with an area equal or unequal to that of the transparent pixel electrode. Further, the double-drain thin-film transistor is formed on the substrate at the center of the pixel structure. The double-drain thin-film transistor has a gate, a channel layer, a source region and two drain regions. The source region is electrically connected to the data line, and the drain regions are electrically connected to the transparent and reflective pixels, respectively. The channel is located on the gate dielectric layer on the gate, the source region and the drain regions are located on the channel layer, and the gate is electrically connected to the scan line.

In the present invention, two edges of the transflective pixel structure further include a first pixel storage capacitor and a second pixel storage capacitor. The first pixel storage capacitor includes a first common line formed on the substrate (as a bottom electrode), a conductive layer over the first common line and the transparent pixel electrode (as a top electrode), and the gate dielectric between the bottom and top electrodes. The conductive layer is electrically connected to the transparent pixel electrode via a contact window formed in the protection layer. The second pixel storage capacitor includes a second common line formed on the substrate (as a bottom electrode), the reflective pixel electrode over the second common line (as a top electrode) and the gate dielectric layer.

As the pixel structure provided by the present invention includes both a transparent pixel electrode and a reflective pixel electrode, the liquid crystal display comprising such a pixel structure has the advantages of transflective liquid crystal display such as power saving characteristic.

Further, as the thin-film transistor is formed at a center of the pixel structure, and two drain regions of the thin-film transistor simultaneously drive the pixel electrodes at two sides, so that the normal operation of the pixel structure can be maintained without being affected by the process particle.

By forming the thin-film transistor on the center of the pixel structure, the electric field on the pixel structure is more uniform and advantageous to display.

As the pixel storage capacitor is not formed on the scan line, the design of the driving circuit of the present invention is simplified.

BRIEF DESCRIPTION OF DRAWINGS

These, as well as other features of the present invention, will become more apparent upon reference to the drawings wherein.

DETAILED DESCRIPTION

Figure 1:
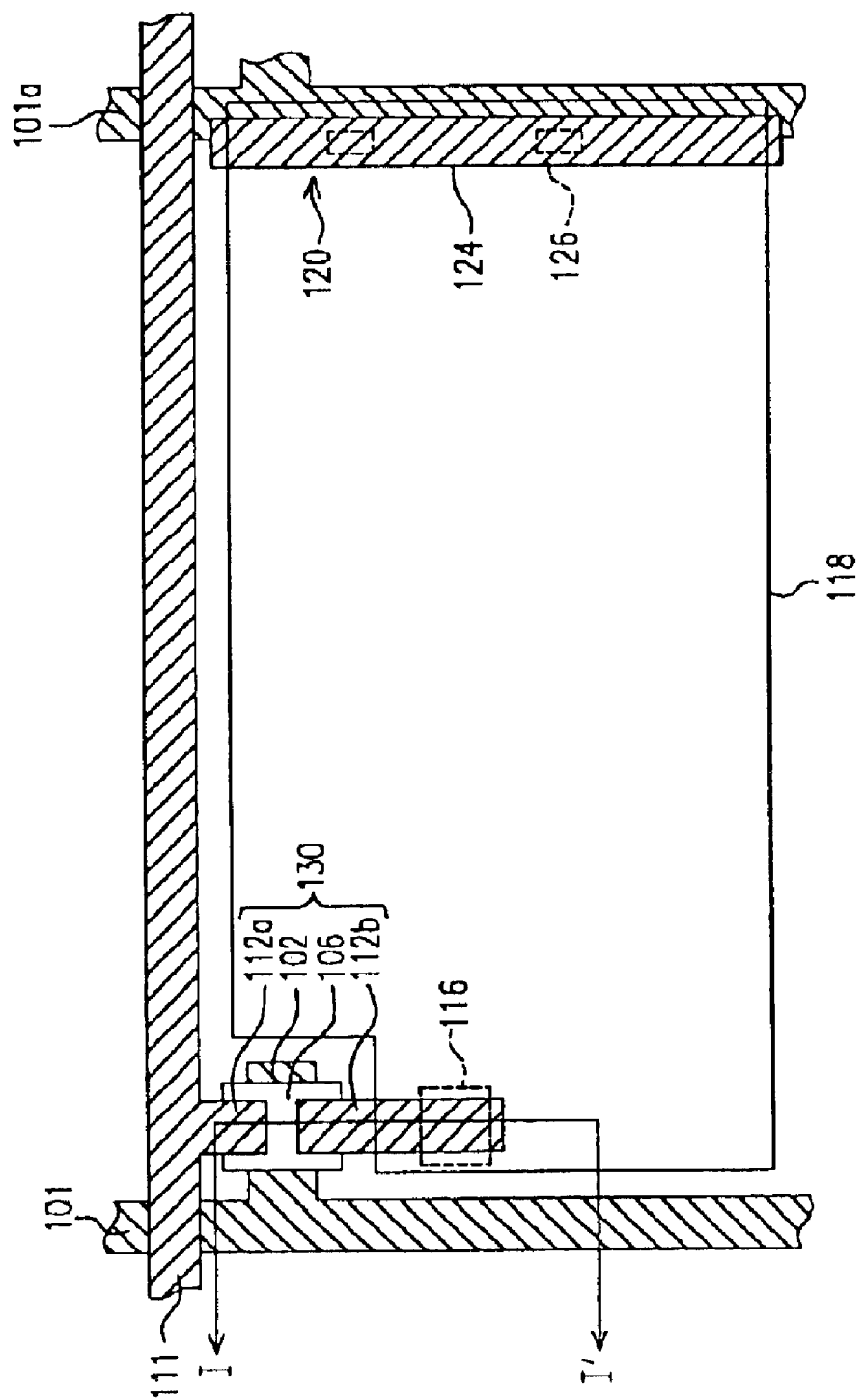
FIG. 1 is a top view of a conventional pixel structure.
Figure 2:
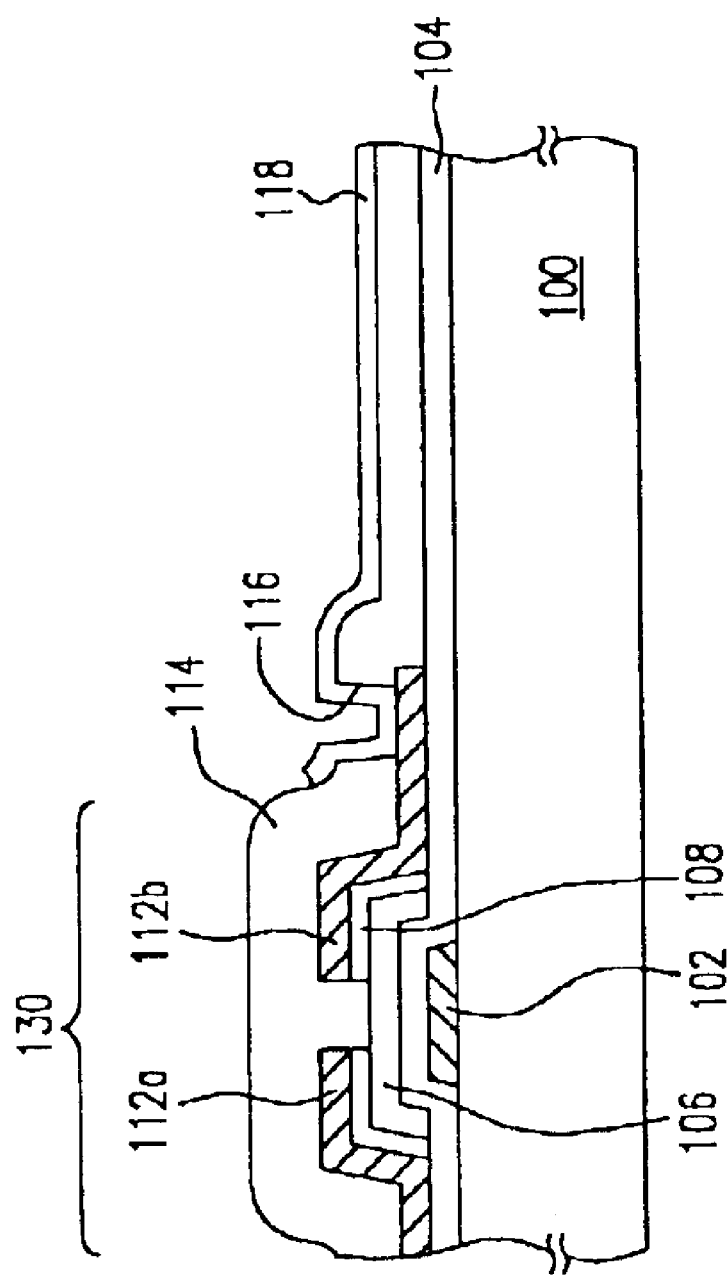
FIG. 2 shows a schematic cross-sectional view along line I–I' as shown in FIG. 1.
Figure 3:
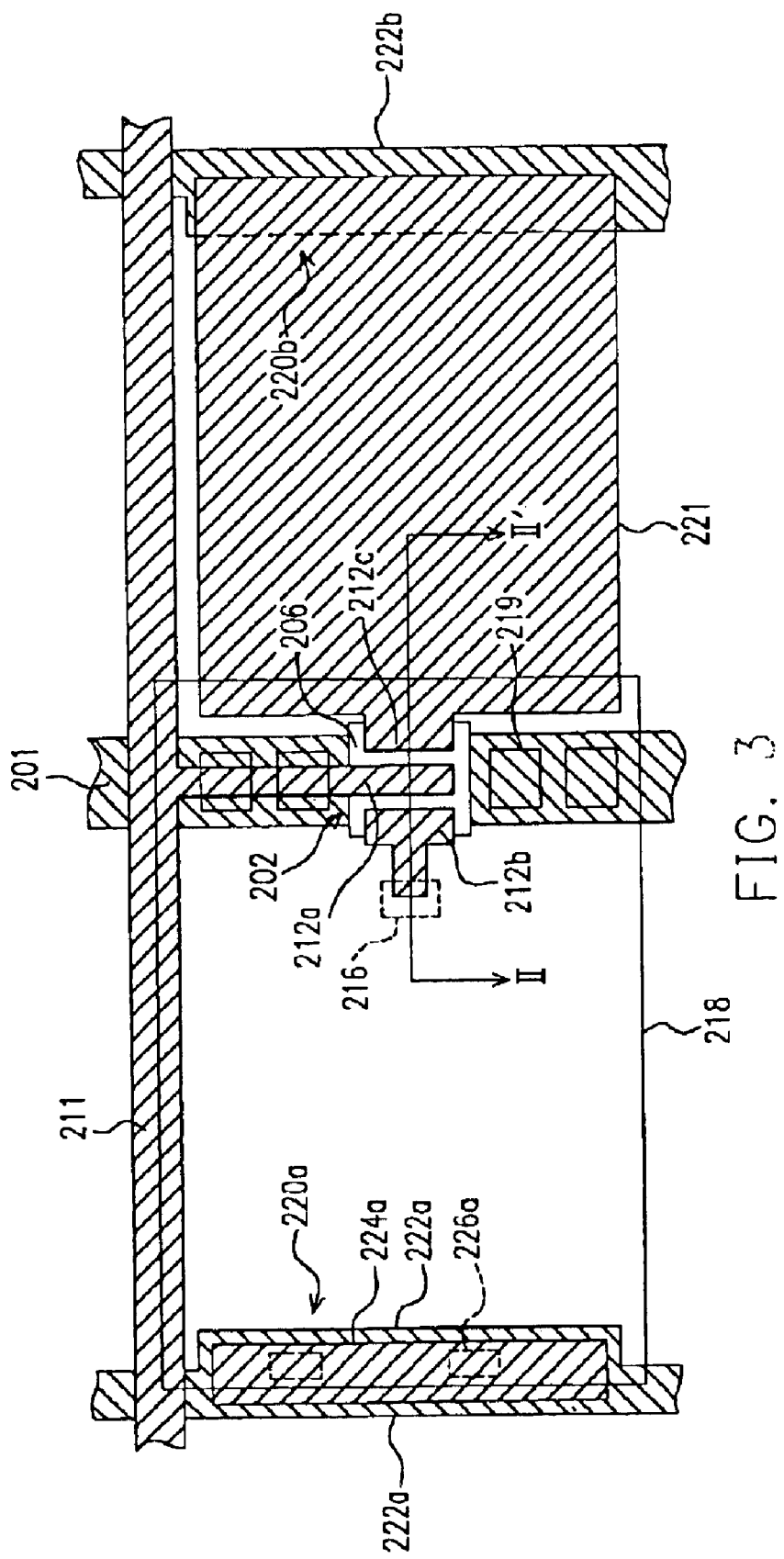
FIG. 3 is a top view of a pixel structure provided by the present invention.
Figure 4:
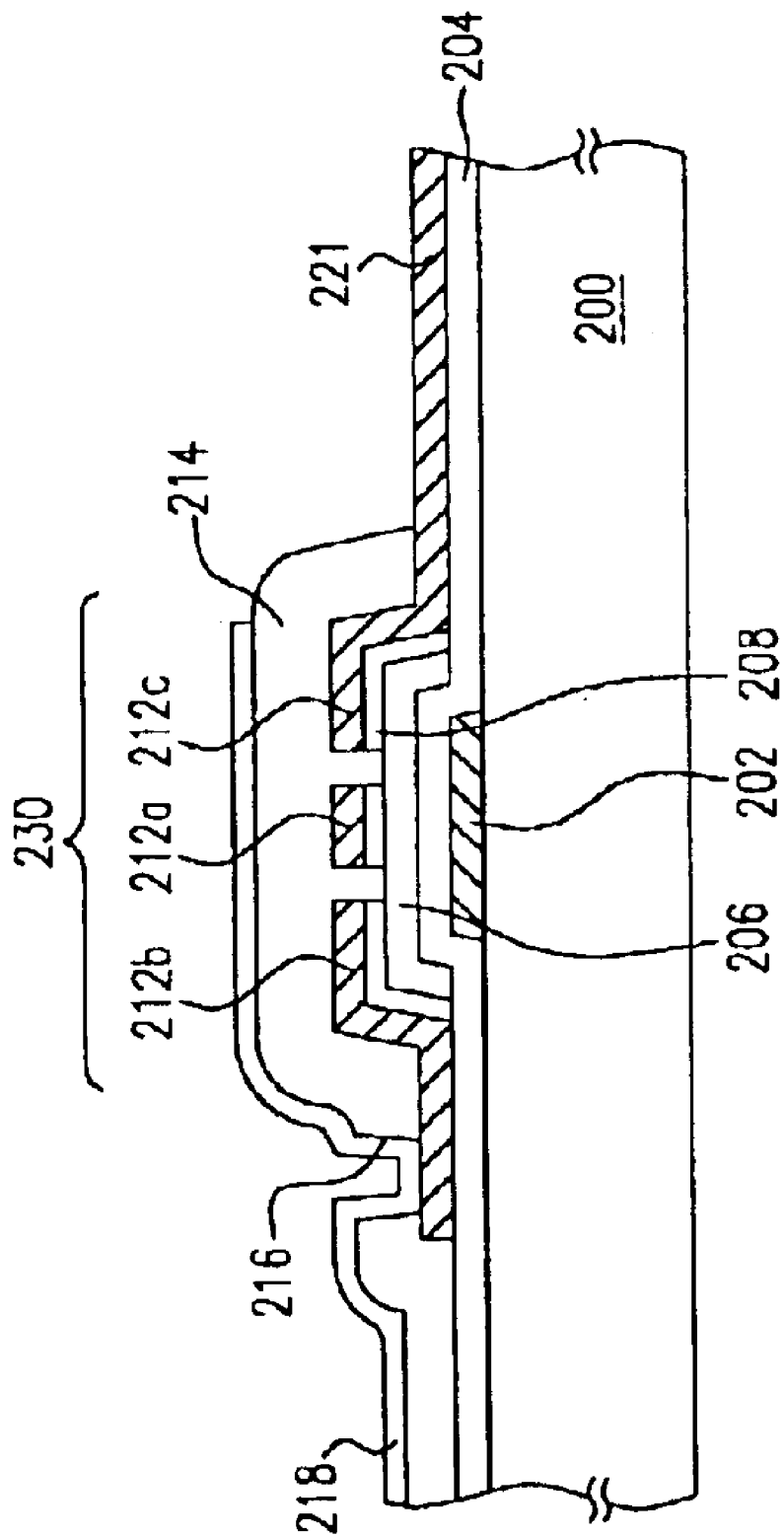
FIG. 4 shows a cross sectional view along the line II–II' as shown in FIG. 3.

FIG. 3 shows a top view of a pixel structure provided by the present invention, and FIG. 4 is a cross-sectional view along the line II–II" of FIG. 3.

Referring to FIGS. 3 and 4, a substrate 200 is provided. The substrate 200 includes a transparent glass substrate or a transparent plastic substrate, for example. A scan line 201 and a gate 202 are formed on the substrate 200. The scan line 201 is connected to the gate 201.

A gate dielectric layer 204 is formed on the substrate 200 globally to cover the scan line 201 and the gate 202. The material for forming the gate dielectric layer 204 includes silicon nitride or silicon oxide, for example.

A channel layer 206 is formed on the gate dielectric layer 204 over the gate 202. The material for forming the channel layer 206 includes amorphous silicon, for example. A source region 212a and two drain regions 212b, 212c are formed on the channel layer 206, and a data line 211 and a reflective pixel electrode 221 electrically connected to the source region 212a are formed on the gate dielectric layer 204. The reflective pixel electrode 221 is electrically connected to the drain region 212c. The gate 202, the channel layer 206, the source region 212a and the drain regions 212b and 212c construct a double-drain thin-film transistor 230. The double-drain thin-film transistor 230 is located at the center of the pixel structure.

In the present invention, an Ohmic contact layer 208 is formed between the channel layer 206, the source region 212a and the drain regions 212b and 212c to increase the electric contact.

A protection layer 214 is formed over the substrate to cover the double-drain thin-film transistor 230 and a part of the gate dielectric layer 204, and expose a part of the reflective pixel electrode 221. The material for forming the protection layer 214 includes insulation material such as silicon nitride.

An opening 216 is formed in the protection layer 214 to expose the drain region 212b. A transparent pixel electrode 218 is then formed on the protection layer 214. The transparent pixel electrode 218 is electrically connected to the drain 212b. The part of the transparent pixel electrode 218 over the scan line 201 further comprises a plurality of openings 219 to reduce the parasitic capacitance between the transparent pixel electrode 218 and the scan line 201.

Figure 5:
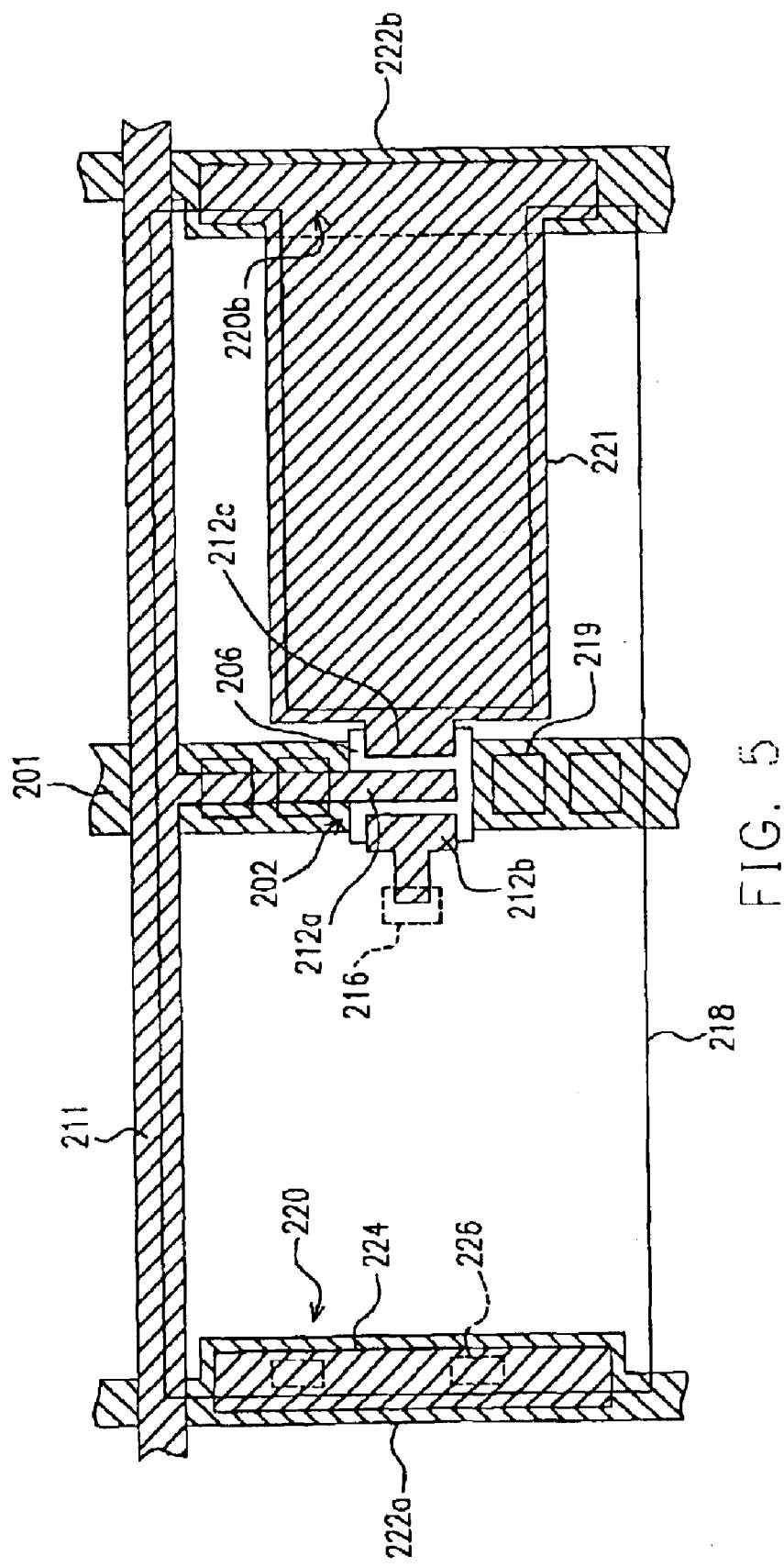
FIG. 5 shows a top view of a pixel structure in another embodiment of the present invention.

In the present invention, the area of the transparent pixel electrode 218 is either equal or unequal to that of the reflective pixel electrode 221. In the embodiment as shown in FIG. 3, the area of the transparent pixel electrode 218 is the same as that of the reflective pixel electrode 221. In FIG. 5, the area of the transparent pixel electrode 218 is larger than that of the reflective pixel electrode 221. The area of the transparent pixel electrode 218 can also be designed smaller than that of the reflective pixel electrode 221. It is appreciated that the pixel structure can be designed with specific area ratio between the transparent and reflective pixel electrodes and locations thereof according to specific requirement.

In addition, two edges of the transflective pixel structure provided by the present invention further comprise two pixel storage capacitors 220a and 220b. The pixel storage capacitor 220a comprises a common line 222a (as a bottom electrode), a conductive layer 224 over the common line 222a and the transparent pixel electrode 218 (as a top electrode), and the gate dielectric layer 204 between the bottom and top electrodes thereof. The common line 222a is defined at the time for forming the scan line 201 and the gate 202. The conductive layer 224 is formed at the same time for forming the source region 212a, the drain regions 212b, 212c, and the data line 211. The transparent pixel electrode 218 and the conductive layer 224 are electrically connected (to have the same potential) via an opening 226 formed in the protection layer 214.

The pixel storage capacitor 220b comprises a common line 222b (as a bottom electrode), the reflective pixel electrode 221 over the common line 222b (as a top electrode) and the gate dielectric layer 204. The common line 222b is formed simultaneously with the common line 222a, which is defined by the same process for forming the scan line 201 and the gate 202.

Therefore, the transflective pixel structure provided by the present invention comprises a scan line 201, a gate dielectric layer 204, a data line 211, a protection layer 214, a transparent pixel electrode 218, a reflective pixel electrode 221 and a double-drain thin-film transistor 230.

The scan line 201 is formed on the substrate 200, and the gate dielectric layer 204 is formed on the substrate 200 covering the scan line 201. In addition, the data line 211 located on the gate dielectric layer 204 extends along a direction different from that of the scan line 201. The protection layer 214 is formed on a part of the gate dielectric layer 204 and covering the data line 211. The transparent pixel electrode 218 is formed on the protection layer 214. The part of the transparent pixel electrode 218 over the scan line 201 further comprises a plurality of openings 219 to reduce parasitic capacitance between the transparent pixel electrode 218 and the scan line 201. The reflective pixel electrode 221 is located on the exposed portion of the gate dielectric layer 204 with an area equal or unequal to that of the transparent pixel electrode 218. Further, the double-drain thin-film transistor 230 is located on the substrate 200 at the center of the pixel structure. The double-drain thin-film transistor 230 comprises the gate 202, the channel layer 206, the source region 212a and the drain regions 212b and 212c electrically connected to the transparent and reflective pixel electrodes, respectively. The channel layer 206 is formed between the source region 212a, the drain regions 212b, 212c and the gate dielectric layer 204 on the gate 202, while the gate 202 is electrically connected to the scan line 201.

In the present invention, two edges of the transflective pixel structure further comprise a pixel storage capacitor 220a and a pixel storage capacitor 220b. The pixel storage capacitor 220a comprises a common line 222a (as a bottom electrode), a conductive layer 224 over the common line 222a and the transparent pixel electrode 218 (as a top electrode), and the gate dielectric layer 204 between the bottom and top electrodes thereof. The pixel storage capacitor 220b comprises a common line 222b (as a bottom electrode), the reflective pixel electrode 221 over the common line 222b (as a top electrode) and the gate dielectric layer 204.

The present invention forms both transparent and reflective structures within the same pixel structure to attain advantages such as power saving of the transflective liquid crystal display. In addition, by arranging a plurality of the pixel structures provided by the present invention with a delta type distribution on the substrate, the quality is further enhanced.

Accordingly, the present invention has at least the following advantages:

1. As the same pixel structure contains both reflective and transparent structures, the liquid crystal display using such pixel structure has the advantages of the transflective liquid crystal display, including the power saving function.

2. As the thin-film transistor is located on the center of the pixel structure, the pixel structure will not mal-function or fail for being affected by process particles.

3. The location of the thin-film transistor on the center of the pixel structure results in a more uniform distribution of electric field over the pixel structure.

4. The pixel storage capacitors are not located on the scan line, so that the design of the driving circuit is simplified.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. A transflective pixel structure suitably formed on a substrate, the pixel structure comprising:

a scan line formed on the substrate;

a gate dielectric layer formed on the substrate to cover the scan line;

a data line formed on the gate dielectric layer and extending with a direction different from that of the scan line;

a protection layer formed on a part of the gate dielectric layer to cover the data line;

a transparent pixel electrode formed on the protection layer;

a reflective pixel electrode formed on the exposed gate dielectric layer; and a double-drain thin-film transistor formed on a center of the pixel structure, further comprising a gate, a source region electrically connected to the data line, two drain regions electrically connected to the transparent pixel electrode and the reflective pixel electrode, respectively, a channel layer located on the gate dielectric layer over the gate, wherein the source and drain regions are formed on the channel layer, and the gate is electrically connected to the scan line.

2. The pixel structure according to claim 1, wherein the transparent pixel electrode has an area the same as that of the reflective pixel electrode.

3. The pixel structure according to claim 1, wherein the transparent pixel electrode has an area different from that of the reflective pixel electrode.

4. The pixel structure according to claim 1, further comprising a first pixel storage capacitor and a second pixel storage capacitor formed at respective sides of the pixel structure.

5. The pixel structure according to claim 4, wherein the first pixel storage capacitor comprises a first common line formed on the substrate, a conductive layer and the transparent pixel electrode on the first common line and the gate dielectric layer, and the conductive layer is electrically connected to the transparent pixel electrode.

6. The pixel structure according to claim 4, wherein the second pixel storage capacitor comprises a second common line formed on the substrate, the reflective pixel electrode on the second common line, and gate dielectric layer.

7. The pixel structure according to claim 1, wherein the transparent pixel electrode over the scan line further comprises a plurality of openings to reduce parasitic capacitance between the transparent pixel electrode and the scan line.

8. The pixel structure according to claim 1, wherein the material of the transparent pixel electrode includes indium tin oxide.

9. The pixel structure according to claim 1, wherein the material of the reflective pixel electrode includes metal.

10. The pixel structure according to claim 1, further comprising an Ohmic contact layer formed between the channel layer, the source and drain regions.

11. The pixel structure according to claim 1, wherein the reflective pixel electrode is directly connected to one of the drain regions of the double-drain thin-film transistor.

12. A transflective pixel structure suitably formed on a substrate, the pixel structure comprising:

a double-drain thin-film transistor formed on a center of the pixel structure, wherein the double-drain thin-film transistor has a gate, a channel layer, a source region and two drain regions;

a scan line formed on the substrate, the scan line being electrically connected to the gate of the double-drain thin-film transistor;

a data line formed on the substrate with an extension direction different from that of the scan line, the data line being electrically connected to the source region of the double-drain thin-film transistor;

a transparent pixel electrode formed on the substrate, the transparent pixel electrode being electrically connected to one of the drain regions of the double-drain thin-film transistor; and a reflective pixel electrode formed on the substrate, the reflective pixel electrode being electrically connected to the other one of the drain regions of the double-drain thin-film transistor.

13. The pixel structure according to claim 12, wherein the transparent pixel electrode has an area the same as that of the reflective pixel electrode.

14. The pixel structure according to claim 12, wherein the transparent pixel electrode has an area different from that of the reflective pixel electrode.

15. The pixel structure according to claim 12, further comprising a first pixel storage capacitor and a second pixel storage capacitor formed at respective sides of the pixel structure.

16. The pixel structure according to claim 12, wherein the transparent pixel electrode over the scan line further comprises a plurality of openings to reduce parasitic capacitance between the transparent pixel electrode and the scan line.

17. The pixel structure according to claim 12, wherein the material of the transparent pixel electrode includes indium tin oxide.

18. The pixel structure according to claim 12, wherein the material of the reflective pixel electrode includes metal.

19. The pixel structure according to claim 12, further comprising an Ohmic contact layer formed between the channel layer, the source and drain regions.

20. The pixel structure according to claim 12, wherein the reflective pixel electrode is directly connected to one of the drain regions of the double-drain thin-film transistor.

* * * * *